March 22, 1949. A. GUTTMANN 2,465,087
CUTLERY
Filed March 24, 1947
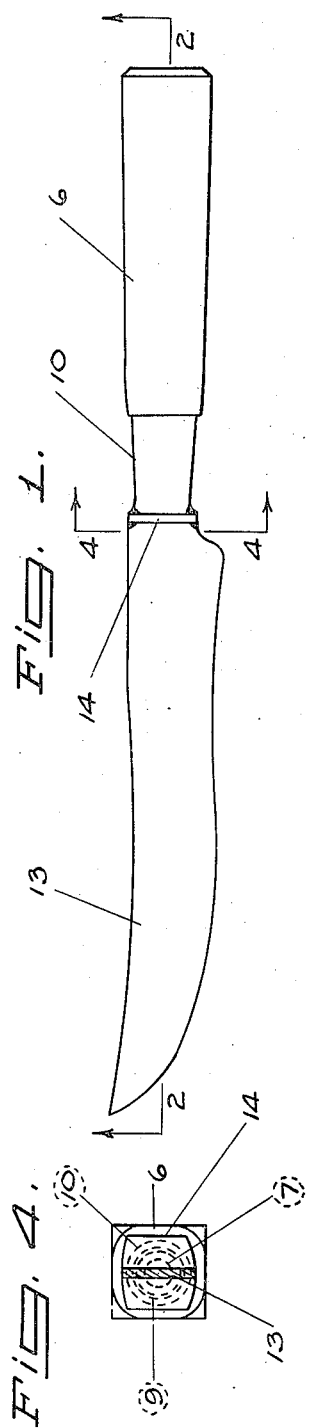
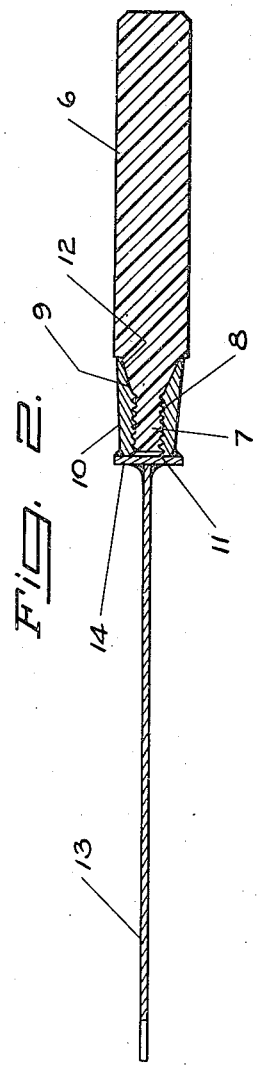
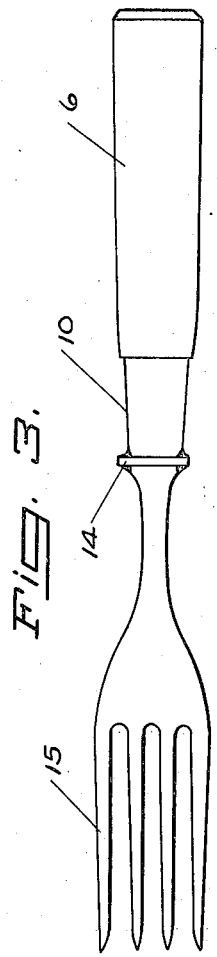
INVENTOR.
ALFRED GUTTMANN
BY Edward Healy
ATTORNEY Patented Mar. 22, 1949

2,465,087

UNITED STATES PATENT OFFICE 2,465,087

CUTLERY

Alfred Guttmann, San Francisco, Calif.

Application March 24, 1947, Serial No. 736,690

1 Claim. (Cl. 30—342)

This invention relates to improvements in cutlery, particularly in tableware utensils such as knives, forks, spoons and the like and has special reference to an improved transparent handle and to an improved ferrule and means for rigidly securing the various parts one to the other.

One of the objects of the present invention is to threadedly secure the ferrule to the handle and to form a tapered male portion on the handle, which male portion is adapted to fit in a tapered recessed portion formed in the bolster, the said tapered portions functioning to tighten the members together and to also strengthen the handle for preventing breakage of the same.

Another object of the present invention is to weld the bolster of the knife blade to the ferrule, after which the said knife blade is tempered and sharped in any suitable manner.

A further object of the present invention is to form the handle of a transparent material, which transparent material is preferably a suitable plastic, such as Lucite, and eliminate any opaque or unsightly objects within the handle.

A further object of the present invention is to form the transparent handle with a plurality of flat surfaces and corners whereby reflections are emitted therefrom.

A still further object of the present invention is to provide a tableware article of the character described that is durable, simple in construction, economical to manufacture and highly efficient and serviceable in use.

Other objects and advantages will be apparent during the course of the following description.

In the accompanying drawing forming a part of this specification, wherein for the purpose of illustration like numerals designate like parts throughout the same, Fig. 1 is a side elevational view of a table knife embodying the invention, Fig. 2 is a longitudinal sectional view taken through line 2—2 of Fig. 1 looking in direction of the arrows, Fig. 3 is a plan view of a fork embodying the invention, and Fig. 4 is a vertical sectional view taken on line 4—4 of Fig. 1, looking in direction of the arrows.

Referring in detail to the drawing and to the numerals thereof, the numeral 6 designates, as a whole, the improved handle, which handle is preferably constructed of a suitable transparent plastic, such as Lucite, and is artistically formed in any desired shape, but is preferably rectangular, hexagon or in a suitable shape having a series of flat surfaces and corners, whereby reflections are emitted for enhancing the attractiveness of the device. The front portion of the handle is reduced forming a stem as at 7, which stem is externally threaded as at 8 and tapers outwardly as shown to advantage at 9 in Fig. 2. The numeral 10 designates a suitable ferrule preferably made of metal and constructed with a threaded opening 11 and a tapered recessed portion 12 to conform with the said threaded and tapered portions of the handle. The numeral 13 designates a conventional metal knife blade welded to the bolster 14, which bolster is welded to the ferrule 10. The said parts can be brazed or integrally formed in any other suitable manner. The knife blade is tempered and sharpened after the said parts are welded or otherwise fixed together and before being positioned on the handle. Rosin, litharge mixed with glycerine, or a suitable cement is preferably applied on the threads to prevent circumferential movement of the handle with respect to the knife and to assist in positively securing the parts together. In Fig. 3 there is shown to advantage, a conventional metal fork 15 welded to the ferrule 10 to illustrate how the transparent plastic handle 6 can be provided on forks or spoons in the same manner as on knives.

It will be obvious from the foregoing description taken in conjunction with the accompanying drawing that an improved transparent handle has been provided and also, that an improved ferrule is utilized for securing the said handle to a conventional knife blade or fork in a practical and positive manner, the tapered connection providing the maximum of strength, whereby the possibility of breaking the handle at the joint is eliminated.

It is to be understood that the forms of my invention herewith shown and described are to be taken as preferred examples of the same and that various changes relative to size, shape and arrangement of parts may be resorted to without departing from the spirit of the invention or the scope of the subjoined claim.

Having thus described my invention, I claim:

An article of the character described, comprising a transparent rigid handle constructed of plastic material, a metal portion forming a tableware utensil, a metal bolster welded to the inner end of the said utensil, a metal ferrule welded to the said bolster, an internally threaded aperture within the said ferrule, a flared recessed portion leading from the said aperture, an externally threaded stem on the front portion of the said handle capable of being threadedly secured into the said aperture and a tapered portion on the said stem conforming with the flared recessed portion in the said ferrule, whereby the said utensil and transparent handle are substantially retained one to the other.

ALFRED GUTTMANN.

REFERENCES CITED

The following references are of record in the file of this patent:

UNITED STATES PATENTS

| Number | Name | Date |
|---|---|---|
| 229,219 | Wilson | June 22, 1880 |
| 648,265 | Von Jaraczewski | Apr. 24, 1900 |
| 2,300,671 | Howard | Nov. 3, 1942 |

FOREIGN PATENTS

| Number | Country | Date |
|---|---|---|
| 1,998 | Great Britain | July 2, 1872 |
| 628,285 | Germany | Mar. 31, 1936 |